(12) United States Patent
Migault et al.

(10) Patent No.: US 11,240,214 B2
(45) Date of Patent: Feb. 1, 2022

(54) FLOW MULTIPLEXING IN IPSEC

(71) Applicants: Daniel Migault, Montreal (CA); Stere Preda, Longueuil (CA)

(72) Inventors: Daniel Migault, Montreal (CA); Stere Preda, Longueuil (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 221 days.

(21) Appl. No.: 16/625,122

(22) PCT Filed: Jun. 20, 2017

(86) PCT No.: PCT/IB2017/053675
§ 371 (c)(1),
(2) Date: Dec. 20, 2019

(87) PCT Pub. No.: WO2018/234849
PCT Pub. Date: Dec. 27, 2018

(65) Prior Publication Data
US 2020/0145394 A1    May 7, 2020

(51) Int. Cl.
*H04L 29/06* (2006.01)
*H04L 12/741* (2013.01)

(52) U.S. Cl.
CPC ........ *H04L 63/0485* (2013.01); *H04L 45/745* (2013.01); *H04L 63/0272* (2013.01); *H04L 63/164* (2013.01); *H04L 63/20* (2013.01)

(58) Field of Classification Search
CPC ............. H04L 63/0485; H04L 63/0272; H04L 63/164; H04L 63/20; H04L 45/745
USPC .......................................................... 726/15
See application file for complete search history.

(56) References Cited

U.S. PATENT DOCUMENTS

| | | | |
|---|---|---|---|
| 7,017,042 B1 | 3/2006 | Ziai et al. | |
| 7,181,612 B1 | 2/2007 | Pellacuru et al. | |
| 7,676,814 B2 | 3/2010 | Karighattam et al. | |
| 2001/0033583 A1* | 10/2001 | Rabenko ................. | H04B 3/23 370/503 |
| 2002/0099939 A1* | 7/2002 | Choo .................... | H04L 63/061 713/164 |
| 2003/0018908 A1* | 1/2003 | Mercer ............... | H04L 63/0485 713/193 |

FOREIGN PATENT DOCUMENTS

| | | |
|---|---|---|
| EP | 0982909 A2 | 3/2000 |
| WO | 2015/005839 A1 | 1/2015 |

OTHER PUBLICATIONS

Steve Friedl's Unixwiz.net Tech Tips: "An Illuslialed Guide to IPsec"; uploaded from the Internet on Dec. 19, 2019; 17 pages.

(Continued)

*Primary Examiner* — Michael S McNally
(74) *Attorney, Agent, or Firm* — Ericsson Canada Inc.; David Rahmer

(57) ABSTRACT

Systems and methods for processing inbound and outbound secure packet traffic are provided herein. A first lookup operation can be performed to identify a security association corresponding to a received packet. A second lookup operation can be performed to determine a security parameters index associated with the packet and the identified security association. The packet can be processed in accordance with the security association and the security parameters index.

22 Claims, 8 Drawing Sheets

(56) References Cited

OTHER PUBLICATIONS

Mitsuru Kanda et al.: "USAGI IPv6 IPsec Development for Linux"; IEEE 2004; 5 pages.
Kernal Network Stack Made Easy, uploaded from the Internet on Dec. 19, 2019; 7 pages.

* cited by examiner

FLOW MULTIPLEXING IN IPSEC

TECHNICAL FIELD

The present disclosure generally relates to communication networks and security in such networks.

BACKGROUND

Security mechanisms such as Internet Protocol Security (IPsec) can be used to secure communications between two trusted entities over an untrusted network. IPsec is a network protocol suite that has been standardized by the Internet Engineering Task Force (IETF) for authenticating and encrypting data packets transmitted over a network.

IPsec includes protocols for authenticating network entities at the beginning of a session and negotiating cryptographic keys for use during the session. IPsec is used to protect data flows between security endpoints such as a pair of hosts (host-to-host), a pair of security gateways (network-to-network), or a security gateway and a host (network-to-host) by using cryptographic security services over IP networks. IPsec can support network-level peer authentication, data-origin authentication, data integrity, data confidentiality (e.g. encryption), and replay protection.

A data flow can typically be identified by the 5-tuple of values comprising its TCP/IP connection (source IP address, source port number, destination IP address, destination port number, protocol). In a conventional IPsec deployment, a data flow is associated with a Security Association (SA) which contains the cryptographic material (e.g. the encryption/decryption keys) necessary for processing packet traffic. Protected traffic can be uniquely identified by its Security Parameter Index (SPI). This index can be used by a receiving entity to identify the corresponding SA to access the protected information.

As such, each data flow requires a distinct SA such that it can be identified by the corresponding SPI parameter.

SUMMARY

It is an object of the present disclosure to obviate or mitigate at least one disadvantage of the prior art.

In a first aspect of the present disclosure, there is provided a method for outbound packet processing. The method includes receiving a packet, the packet including one or more traffic selector (TS) parameters. A first lookup is performed in a first table to identify a Security Association (SA) associated with the packet in accordance with at least one of the TS parameters. Responsive to identifying the SA, a second lookup is performed in a second table to determine a Security Parameters Index (SPI) value associated with the packet and the identified SA in accordance with at least one of the TS parameters. The packet is processed by encrypting the packet using a security key from the identified SA and adding the determined SPI value to the encrypted packet. The processed packet can then be transmitted.

In another aspect of the present disclosure, there is provided a network node comprising circuitry including a processor and a memory, the memory containing instructions executable by the processor whereby the network node is operative to receive a packet including one or more traffic selector (TS) parameters. The node is operative to perform a first lookup in a first table to identify a Security Association (SA) associated with the packet in accordance with at least one of the TS parameters. Responsive to identifying the SA, the node performs a second lookup in a second table to determine a Security Parameters Index (SPI) value associated with the packet and the identified SA in accordance with at least one of the TS parameters. The node is operative to process the packet by encrypting the packet using a security key from the identified SA and adding the determined SPI value to the encrypted packet; and to transmit the processed packet.

In some embodiments, determining the SPI value can include selecting the SPI value from a plurality of SPI values associated with the identified SA.

In some embodiments, a security policy defines the at least one of the TS parameters from the received packet to be used for the first lookup.

In some embodiments, the first table is a security policy database and/or the second table is a SPI database. The SPI database can be associated with the identified SA.

In another aspect of the present disclosure, there is provided a method for inbound packet processing. The method includes receiving an encrypted packet, the packet including a Security Parameters Index (SPI) value. A first lookup is performed in a first table to identify a Security Association (SA) associated with the packet in accordance with the SPI value. Responsive to identifying the SA, a second lookup is performed in a second table to determine one or more traffic selector (TS) parameters in accordance with the SPI value. The packet is decrypted using a security key from the identified SA. The packet is verified by comparing TS parameters in decrypted packet to the TS parameters determined by the second lookup. The decrypted packet is processed.

In another aspect of the present disclosure, there is provided a network node comprising circuitry including a processor and a memory, the memory containing instructions executable by the processor whereby the network node is operative to receive an encrypted packet including a Security Parameters Index (SPI) value. The node is operative to perform a first lookup in a first table to identify a Security Association (SA) associated with the packet in accordance with the SPI value. Responsive to identifying the SA, the node performs a second lookup in a second table to determine one or more traffic selector (TS) parameters associated in accordance with the SPI value. The node is operative to decrypt the packet using a security key from the identified SA and to verify the packet by comparing TS parameters in decrypted packet to the TS parameters determined by the second lookup. The node processes the decrypted packet.

In some embodiments, the identified SA is associated with a plurality of SPI values.

In some embodiments, processing the decrypted packet includes forwarding the decrypted packet towards a destination.

In some embodiments, the first table is a security policy database and/or the second table is a TS parameter database.

The various aspects and embodiments described herein can be combined alternatively, optionally and/or in addition to one another.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures, wherein.

DETAILED DESCRIPTION

Figure 1:
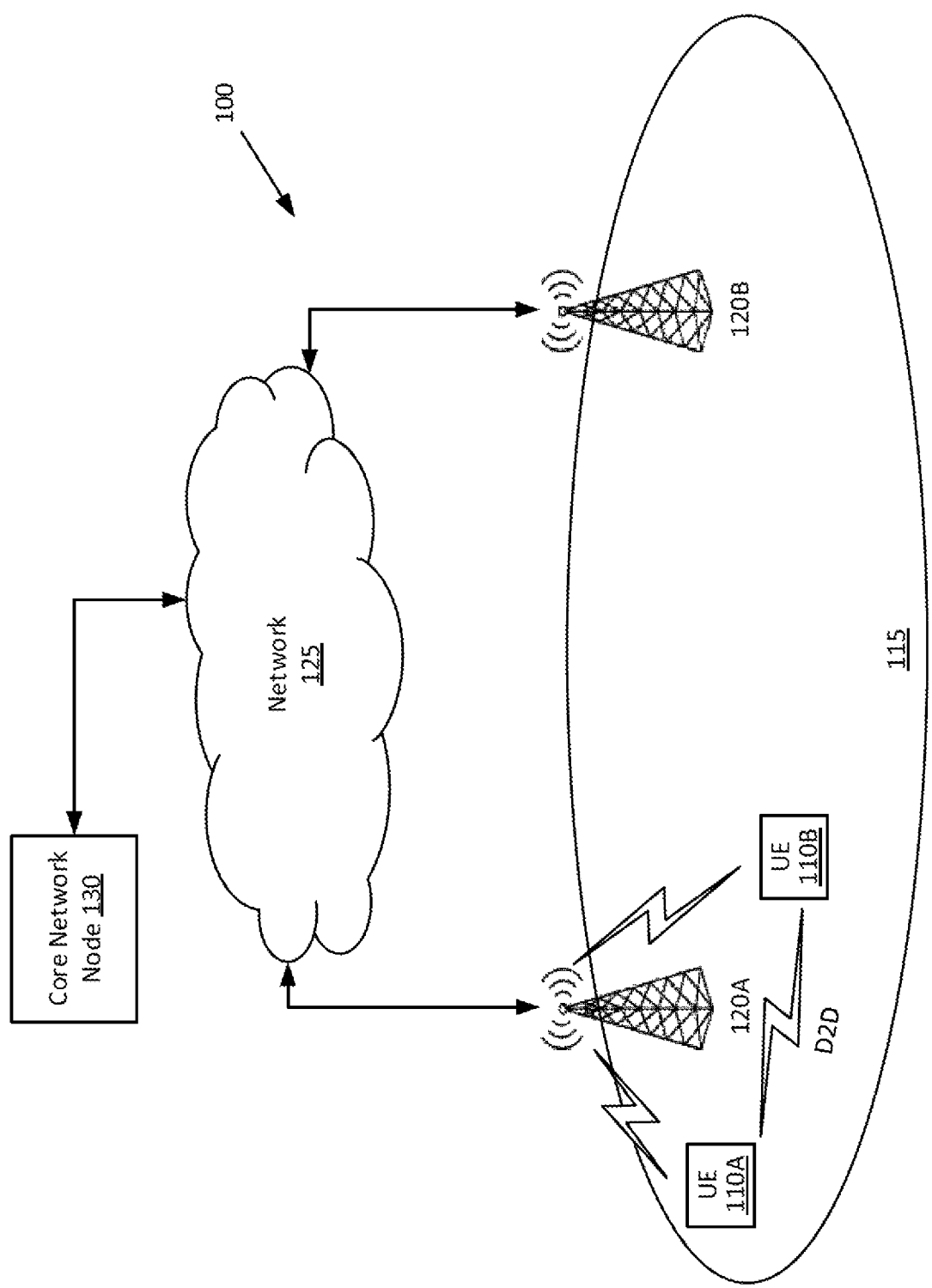
FIG. 1 illustrates an example wireless network.

The embodiments set forth below represent information to enable those skilled in the art to practice the embodiments. Upon reading the following description in light of the accompanying drawing figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises." "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In some embodiments, the non-limiting term "user equipment" (UE) is used and it can refer to any type of wireless device which can communicate with a network node and/or with another UE in a cellular or mobile or wireless communication system. Examples of UE are target device, device to device (D2D) UE, machine type UE or UE capable of machine to machine (M2M) communication, personal digital assistant, tablet, mobile terminal, smart phone, laptop embedded equipped (LEE), laptop mounted equipment (LME), USB dongles, ProSe UE, V2V UE, V2X UE, MTC UE, eMTC UE, FeMTC UE, UE Cat 0, UE Cat M1, narrow band IoT (NB-IoT) UE, UE Cat NB1, etc.

In some embodiments, the non-limiting term "network node" is used and it can correspond to any type of radio access node (or radio network node) or any network node, which can communicate with a UE and/or with another network node in a cellular or mobile or wireless communication system. Examples of network nodes are NodeB, MeNB, SeNB, a network node belonging to MCG or SCG, base station (BS), multi-standard radio (MSR) radio access node such as MSR BS, eNodeB, network controller, radio network controller (RNC), base station controller (BSC), relay, donor node controlling relay, base transceiver station (BTS), access point (AP), transmission points, transmission nodes. RRU, RRH, nodes in distributed antenna system (DAS), core network node (e.g. Mobility Management Entity (MME), a Packet Data Network (PDN) Gateway (P-GW), a Service Capability Exposure Function (SCEF), etc.), O&M, OSS, Self-organizing Network (SON), positioning node (e.g. E-SMLC), MDT, test equipment, etc.

FIG. 1 illustrates an example of a wireless network 100 that can be used for wireless communications. Wireless network 100 includes UEs 110A-110B and a plurality of network nodes, such as radio access nodes 120A-120B (e.g. eNBs, gNBs, etc.) connected to one or more core network nodes 130 via an interconnecting network 125. The network 100 can use any suitable deployment scenarios. UEs 110 within coverage area 115 can each be capable of communicating directly with radio access nodes 120 over a wireless interface. In some embodiments, UEs 110 can also be capable of communicating with each other via D2D communication.

As an example, UE 110A can communicate with radio access node 120A over a wireless interface. That is, UE 110A can transmit wireless signals to and/or receive wireless signals from radio access node 120A. The wireless signals can contain voice traffic, data traffic, control signals, and/or any other suitable information. In some embodiments, an area of wireless signal coverage associated with a radio access node 120 can be referred to as a cell.

For network security, operators can secure traffic inside and outside their network with IPsec and other protocols. For example, IPsec is used to protect the S1 and X2 control planes as specified by 3GPP TS 33.210 and TS 33.401.

IPsec, as defined according to IETF Request For Comments (RFC) 4301 "Security Architecture for the Internet Protocol" [https://tools.ietf.org/html/rfc4301], has defined two protocols for formatting a packet: Encapsulating Security Payload (ESP) [IETF RFC 4303] and Authentication Header (AH) [IETF RFC 4302]. Conventionally, the ESP format is widely used. Some embodiments herein will be described with respect to ESP but can be extended to AH as well.

Figure 2:
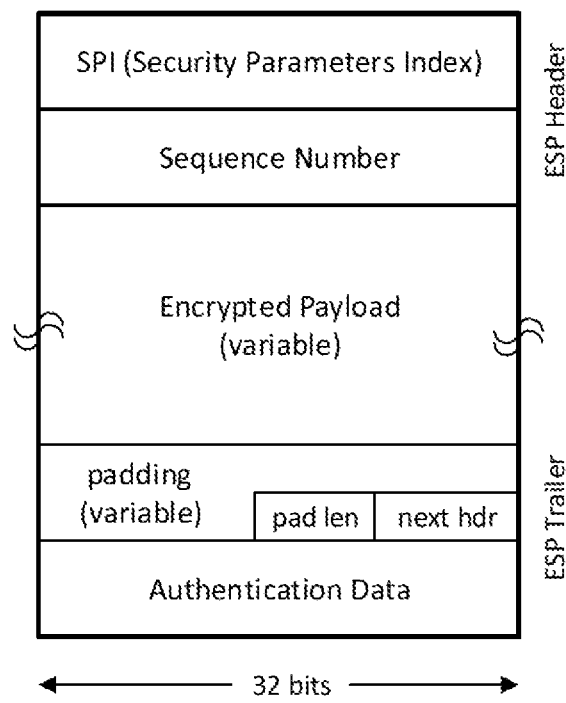
FIG. 2 illustrates an example ESP IPsec packet.

FIG. 2 illustrates an example ESP IPsec protected packet 140. An IPsec packet can be identified by its source IP address, destination IP address and the SPI value. The other remaining parameters are encrypted and cannot be used to identify a flow or other parameters of the original packet. IPsec does not provide any means to describe or tag the encapsulated traffic, which is represented as the Encrypted Payload in FIG. 2. As a result, the conventional IPsec protocol does not enable protection of N distinct flows in a single IPsec channel while indicating the flow to which the packet belongs to any in-path network elements. Nonetheless, such an indication may be useful for deploying load balancers or other in-path middlebox functions.

IPsec can operate in transport mode or tunnel mode. In transport mode, even though it is possible to encrypt some options in the header, the main purpose is to encrypt only the payload of an IP packet. The routing of the packet is therefore not affected as the IP header is not encrypted. In tunnel mode, the entire IP packet is encrypted and encapsulated into a new IP packet with a new IP header. Tunnel mode can be used to establish virtual private networks for communication between endpoints.

FIG. 3 illustrates an example secure network architecture. Network nodes 150 and 156 are the security (e.g. IPsec) endpoints while network nodes 152 and 154 are middlebox functions. In some embodiments, endpoint node 150 can perform an encryption function and endpoint node 156 can perform a decryption function. Accordingly, data is protected as it traverses the example network segment from node 150 to node 152 to node 154 to node 156.

Figure 3A:
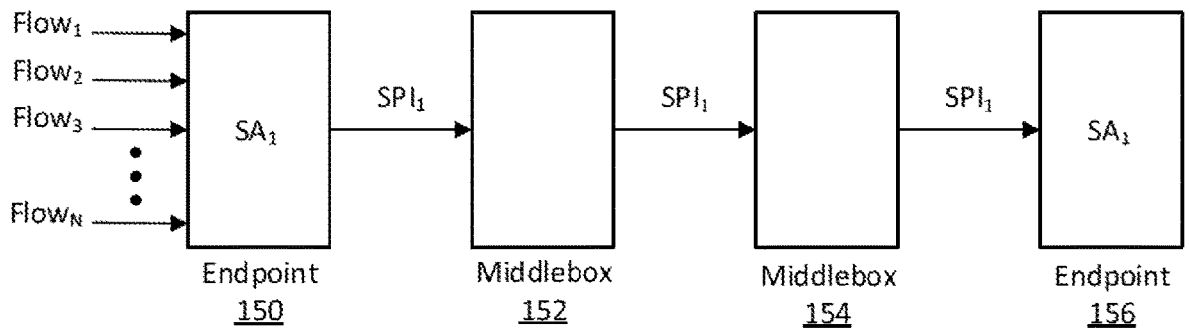
FIG. 3 illustrates an example secure network architecture.

In FIG. 3a, N number of distinct data flows are encapsulated in a single SA (e.g. $SA_1$) having a single associated SPI (e.g. $SPI_1$). Accordingly, with only one SPI being common to all N flows, the in-path elements (e.g. nodes 152, 154) are unable to distinguish between the N different flows. In other words, the middleboxes 152, 154 are considered flow agnostic in this example.

Figure 3B:
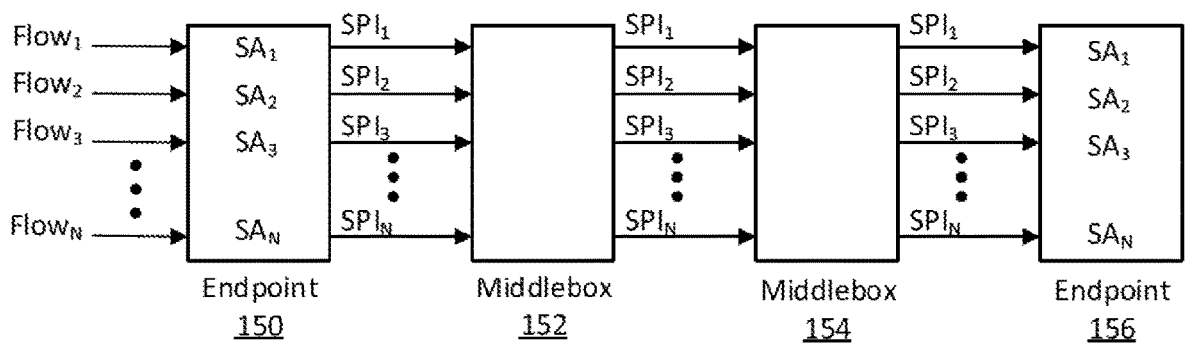

In FIG. 3b, each of the N flows requires its own unique SA (e.g. $SA_1$–$SA_N$) and associated SPI (e.g. $SPI_1$–$SPI_N$). Thus, each flow can be identified by its SPI value, for example by middleboxes 152, 154. In this case, the security endpoints must manage N number of security contexts, each of them potentially involving multiple keys (upstream, down streams, Internet Key Exchange (IKE) keys, authentication keys, etc.). A large number of flows can require a significant signaling load to configure the IPsec tunnels. Every tunnel and corresponding SA (e.g. one SA per flow) will be individually negotiated via IKEv2 which may also require separate cryptographic material (e.g. secret keys). As a result, two sets of cryptographic materials as well as session contexts will be computed between the endpoints 150 and 156 for each of the N flows. This can represent a significant burden in the operator network to be managed if, for example, load balancing is to be deployed.

Some solutions to this issue can employ User Datagram Protocol (UDP) encapsulation and use the source and/or destination ports as tags for flows. UDP is a known protocol for legacy devices such as load balancers. Although load balancing according to SPI is not available for conventional load balancers, this functionality (e.g. SPI-based IPsec load balancing) could potentially be introduced on future load balancers. On the other hand. UDP encapsulation does not consider Network Address Translation (NAT) devices, which makes such an approach non-standard and may not be compatible with other solutions.

Figure 3C:
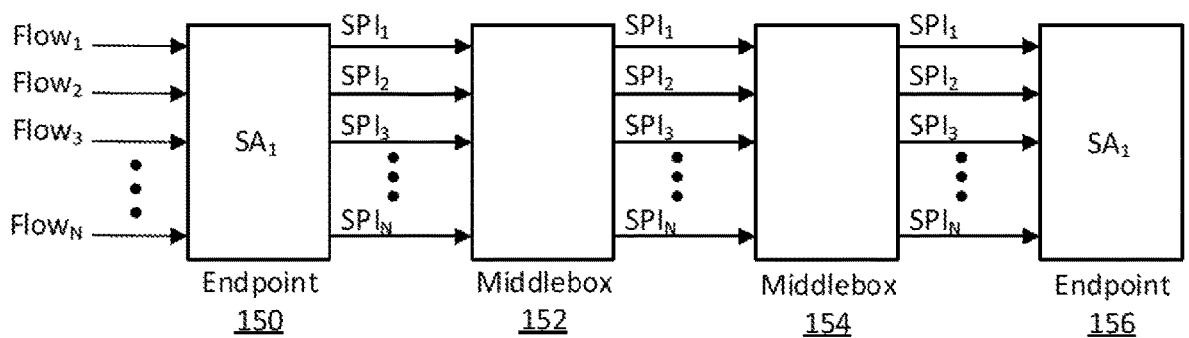

FIG. 3c illustrates an embodiment where multiple flows are IPsec protected by a single SA (e.g. $SA_1$), but each flow can be identified by the in-path network elements 152/154 by having multiple SPIs (e.g. $SPI_1$–$SPI_N$) associated with that single SA. The various flows can be identified directly from encrypted traffic by their SPI value(s). As such, middleboxes 152,154 that may be performing load balancing or other tasks can benefit from the identification of the multiple flows.

By multiplexing a plurality of data flows within a single SA, services such as load balancing or network slice isolation can be enabled while ensuring a minimum signaling load for IPsec tunnel negotiation and management in the operator network. A minimum number of security contexts are required and, implicitly, a minimum number of security keys are required to secure many data flows. This can result in simpler management of the cryptographic material by the operator and reduce the overall burden on the encrypting/decrypting entities.

In general, a security policy is a rule which determines whether a given packet/flow needs to be protected by IPsec or not, while a security association (SA) is the set of algorithms and parameters (e.g. keys) used to encrypt/authenticate the packet/flow.

In conventional IPsec packet processing, an outgoing IP packet is matched against the Security Policy Database (SPD). Traffic Selectors (TS), such as IP addresses, ports, etc., can be taken from the outgoing packet and matched against the SPD. The resulting action is one of encrypt, drop or bypass.

If a match occurs with a security policy, the security policy can provide a reference to a SA that contains the security material necessary to encrypt the packet, the TS parameters, and the SPI. Although the TSs may be included in the SA, they are not considered for outbound traffic. It is noted that the SPI is not typically used as a reference for the SA for processing outbound traffic, but instead an object or memory pointer can be used. The SPI is the identifier between the two IPsec endpoints, while other identifiers can be used internally in each system.

The security policy described in the SA can then be applied and the encrypted packet is transmitted.

In conventional IPsec processing, for incoming packets, the receiving node uses the SPI of the packet to identify the corresponding SA which contains the cryptographic material to decrypt the packet. Prior to processing a decrypted packet (e.g. forwarding the packet to the upper layers), the IPsec stack can check the TS parameters contained in the SA against the TS parameters of the decrypted packet.

In some embodiments of the present disclosure, cryptographic material can be shared for multiple SPIs and TSs. The SPI and TS values may no longer be a part of the SA but instead can be assigned by flow. This can result in a modification to the structure of the SA and a modification to the IPsec packet processing.

In the conventional IPsec architecture, the SA is defined as a flat structure with each parameter as a single value. Some parameters like counters may evolve and change their value(s) over time. However, at a given time such counters have a single value. Some embodiments described herein consider that the SPI and TS parameters can have different values at different times. To implement such features, the SA can include a SPI database (SPI_DB) and a TS database (TS_DB).

The SPI_DB can return a corresponding SPI for a given TS, or set of TSs. The SPI_DB can also have a default rule. If there is no default rule defined, and a TS does not return a SPI, an error can be raised to indicate an inconsistency between the SPD and the SA database. The TS_DB database can return a corresponding TS for a given SPI.

As discussed above, the security policy determines whether a packet needs to be bypassed, discarded or protected based on its TSs. In addition, the security policy cache can indicate which SA is expected to be used to process the packet.

In some embodiments, the security policy can be defined as the union of all TSs associated with the flows and a default rule. When implemented in this manner, the SPI partitions a "global flow" defined by the TSs into subflows. The security policy performs matching according to the global flow and the SA determines the subflow the packet is associated with. In this case, the TSs can be organized hierarchically between the security policy and the SA.

In other embodiments, flow-specific TSs can be defined. In this case, multiple security policies can bind to a single SA. As a result, the SA will have to deal with multiple subflows.

It is noted that, in some implementations, the security policy could simply pass the SPI corresponding to the subflow as a parameter. However, this does not correspond with the conventional IPsec architecture where the SPI is a part of the SA. In such an implementation, part of the SA processing could be outsourced to the security policy for outbound packets.

Figure 4:
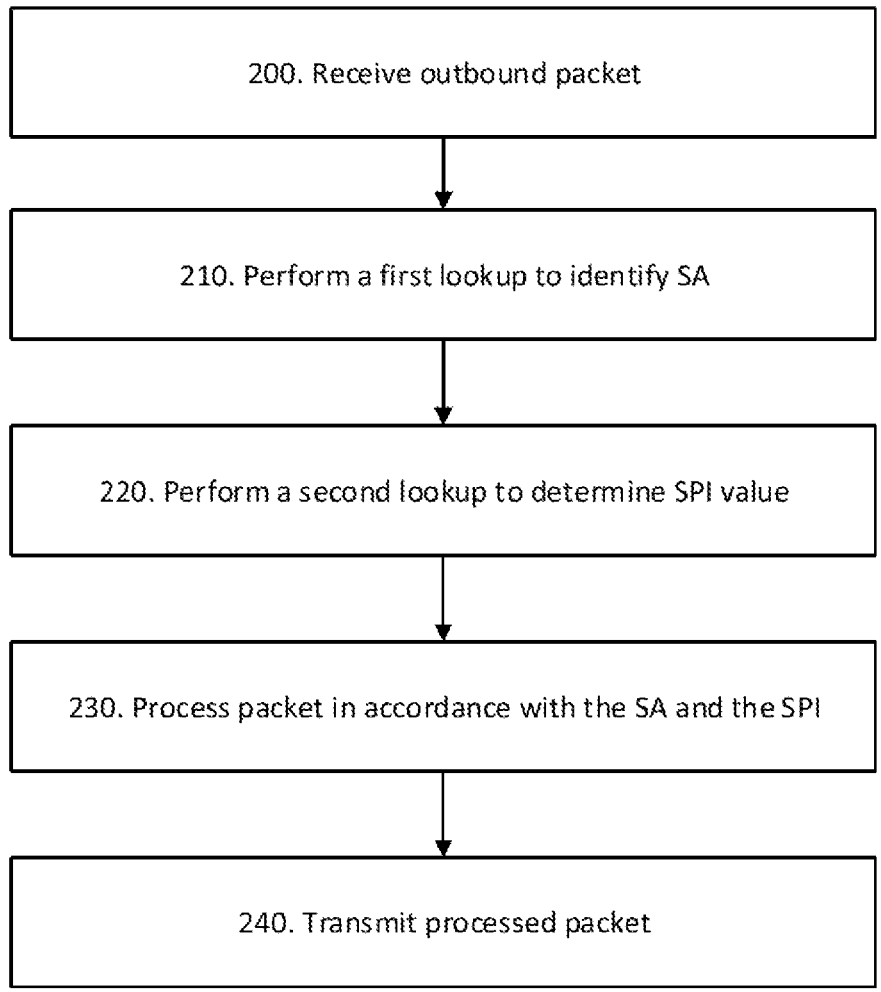
FIG. 4 is a flow chart illustrating a method for outbound packet processing.

FIG. 4 is a flow chart illustrating a method for outbound packet processing. The method of FIG. 4 can be implemented by a network node such as an IPsec endpoint device. In some embodiments, each outgoing packet can be matched against a SPD to determine if outbound packet processing is required.

The method begins by receiving a packet including one or more TS parameters (block 200). Traffic selectors can include, but are not limited to, 5-tuple values (source IP address, source port number, destination IP address, destination port number, protocol), local/remote address, next layer protocol, local/remote port (or ICMP message type/ code or Mobility Header type, depending on the next layer protocol), etc. Further examples of traffic selectors are listed in IETF RFC 4301.

The TS parameters can be extracted from the received packet and used to perform a first lookup in a first table to identify a SA associated with the packet (block 210). Responsive to identifying the SA, a SPI value associated with the packet can be determined by performing a second lookup in a second table in accordance with the identified SA and the TS parameters (block 220).

In some embodiments, the first table lookup can be a SPD lookup to identify the appropriate SA for processing the packet. In some embodiments, the second table lookup can be a SPI database lookup to determine the appropriate SPI value for the packet. In some embodiments, the second lookup can be performed in a database or table that is limited to the identified SA. This operation can be considered similar to performing the SPD lookup using the TS parameters, but only within a subset of the database. In some embodiments, the SPI value is selected from a plurality of SPI values associated with the SA, and can be selected in accordance with the TS parameters.

In some embodiments, the SPI database/table only contains SPI values associated with the SA (e.g. SPIs corresponding to the flows associated with the particular SA). For that purpose, the lookup function indicates the context with the SA (or SP). An identified SA can be implicitly associated with the database requested, as each SA can have its own SPI database.

In other embodiments, more global solutions can be considered, in which case additional references such as a reference to the specific flow can be provided by the SPD lookup.

Following the determination of the SA and SPI, the packet can be processed accordingly (block 230). In some embodiments, this can include applying the policy described in the associated SA. In some embodiments, packet processing includes encrypting the packet using a key from the identified SA and adding the determined SPI value to the encrypted packet.

The processed packet can then be transmitted towards its destination (block 240).

It will be appreciated that one or more of the above steps can be performed simultaneously and/or in a different order. Some steps may be optional and can be omitted in some embodiments.

Figure 5:
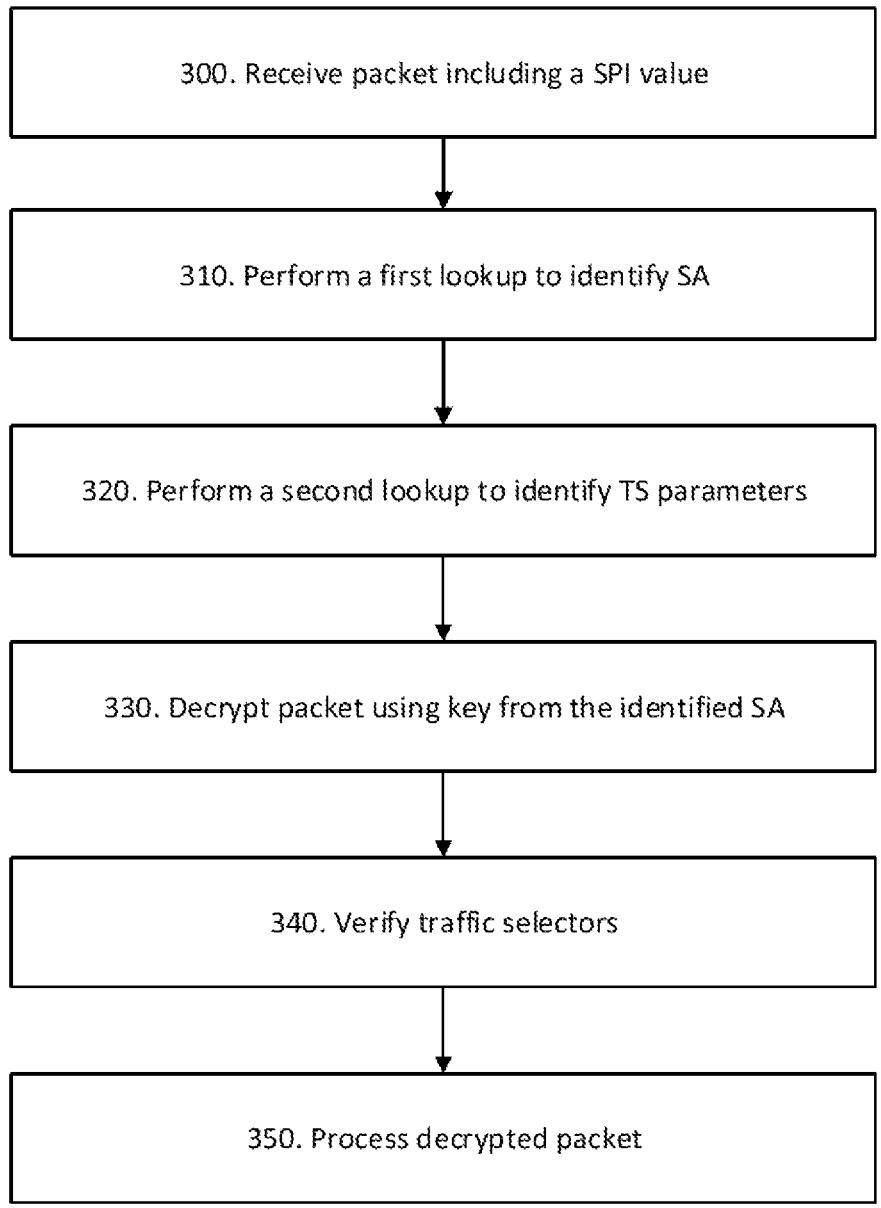
FIG. 5 is a flow chart illustrating a method for inbound packet processing.

FIG. 5 is a flow chart illustrating a method for inbound packet processing. The method of FIG. 5 can be implemented by a network node such as an IPsec endpoint device.

The method begins by receiving an encrypted packet including a SPI value (block 300). The SPI value can be passed as a parameter or read from the packet.

Using the SPI value, a first lookup can be performed in a first table to identify a SA associated with the encrypted packet (block 310). Using the SPI value, a second lookup can be performed in a second table to determine one or more TS parameters associated with the encrypted packet (block 320). In some embodiments, the first table can be a SA database or SPD and the second table can be a TS database. In some embodiments, the first and second lookups are two distinct operations performed on different tables. The SPI value can be used to bind a packet/flow with both its associated SA and TS parameters. In some embodiments, a plurality of SPI values are associated with a single SA.

The encrypted packet is decrypted using a key from the identified SA (block 330). The packet can then be verified by comparing the TS parameters in the decrypted packet to the TS parameters determined by the second lookup (block 340). The TS parameters of the decrypted packet can be compared with the TS parameters provided by the second lookup in order to check that the clear text packet corresponds to the security policy.

Responsive to verifying the packet, the decrypted packet can be processed accordingly (block 350). In some embodiments, this can include passing the decrypted packet to the next/upper layer(s). For example, if the decrypted packet is a TCP packet, it can be sent to the TCP stack for processing. In another example, if a tunnel mode is used, the decrypted packet will be an IP packet and can be processed accordingly. In some embodiments, processing the decrypted packet can include forwarding the decrypted packet towards, or transmitting the decrypted packet to, its intended destination.

It will be appreciated that one or more of the above steps can be performed simultaneously and/or in a different order. Some steps may be optional and can be omitted in some embodiments.

In some embodiments, the SA architecture may require configuration and/or negotiation to manage subflows as described herein. The encryption/decryption endpoints can agree to a "Master SA" using a key negotiation technique such as IKEv2 with the Master SA supporting flows. Flows can be created with sub-exchanges. In one embodiment, the CREATE_CHILD_SA can be reused with an option specifying the new SA is only a sub flow of the MASTER_SA. Other options can also be considered.

In some embodiments, mobility can cause updates to the IP addresses and resynchronization can impact the SA counters (e.g. sequence numbers). In any case, these parameters will be shared by all SAs associated with the subflows and will be impacted equally. It is noted that these parameters are usually associated with the tunnel endpoints. In some embodiments, the tunnel endpoints will be the same for all subflows.

It will be appreciated that a parameter outside of the SPI and TS should not be changed for one subflow and not for the others. Mobility, or changes on the anti-replay windows are operation that can change parameters of a SA. If such operations are performed, they will be performed for all subflows. Accordingly, if a value is changed, it is changed for all subflows.

Figure 6:
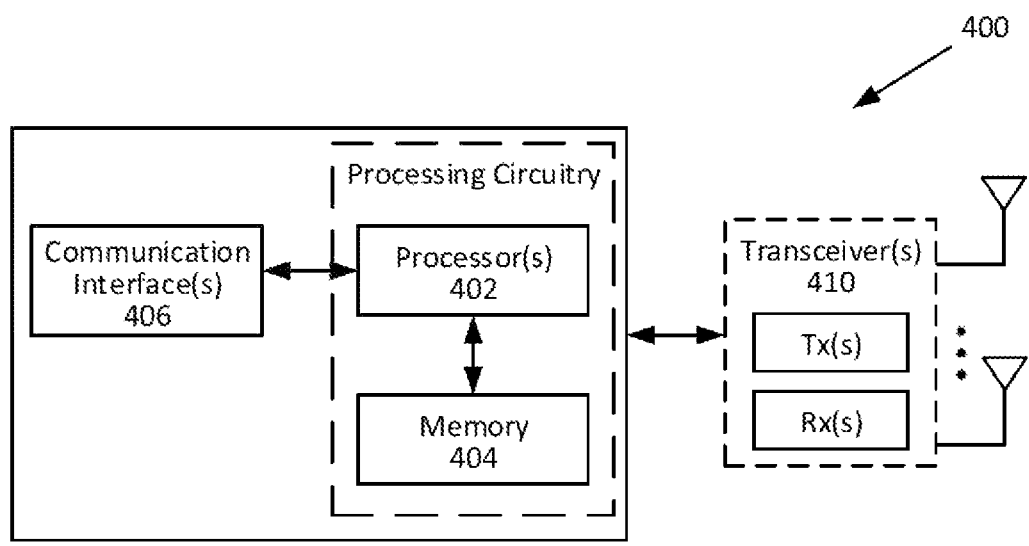
FIG. 6 is a block diagram of an example network node.

FIG. 6 is a block diagram of an exemplary network node 400, in accordance with certain embodiments. Network node 400 can be any of the IPsec endpoint devices as have been described herein. In some embodiments, network node 400 can be a UE, radio node or core network node as described in FIG. 1. Network node 400 includes circuitry including one or more of a processor 402, memory 404, and communication interface 406. The memory 404 contains instructions executable by the processor 402 whereby the network node 400 is operative to process inbound and/or outbound packets according to the various embodiments described herein.

In some embodiments, the optional transceiver 410 facilitates transmitting wireless signals to and receiving wireless signals from other network nodes and devices (e.g. via transmitter(s) (Tx), receiver(s) (Rx), and antenna(s)). The processor 402 executes instructions to provide some or all of the functionalities described above as being provided by network node 400. The memory 404 stores the instructions executed by the processor 402. In some embodiments, the processor 402 and the memory 404 form processing circuitry. The communication interface 406 can include a network interface for communicating signals to other network components, such as a gateway, switch, router, Internet, Public Switched Telephone Network (PSTN), core network nodes or radio network controllers, etc.

The processor 402 can include any suitable combination of hardware to execute instructions and manipulate data to perform some or all of the described functions of network node 400, such as those described above. In some embodiments, the processor 402 can include, for example, one or more computers, one or more central processing units (CPUs), one or more microprocessors, one or more application specific integrated circuits (ASICs), one or more field programmable gate arrays (FPGAs) and/or other logic.

The memory 404 is generally operable to store instructions, such as a computer program, software, an application including one or more of logic, rules, algorithms, code, tables, etc. and/or other instructions capable of being executed by a processor. Examples of memory 404 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the communication interface 406 is communicatively coupled to the processor 402 and can refer to any suitable device operable to receive input for network node 400, send output from network node 400, perform suitable processing of the input or output or both, communicate to other devices, or any combination of the preceding. The communication interface 406 may include appropriate hardware (e.g., port, modem, network interface card, etc.) and software, including protocol conversion and data processing capabilities, to communicate through a network.

Other embodiments of network node 400 can include additional components beyond those shown in FIG. 6 that may be responsible for providing certain aspects of the device's functionalities, including any of the functionalities described above and/or any additional functionalities (including any functionality necessary to support the solutions described above). The various different types of devices may include components having the same physical hardware but configured (e.g., via programming) to support different communication or network technologies, or may represent partly or entirely different physical components.

Processors, interfaces, and memory similar to those described with respect to FIG. 6 may be included in other network nodes described herein. Other network nodes may optionally include or not include a wireless interface (such as the transceiver 410).

Figure 7:
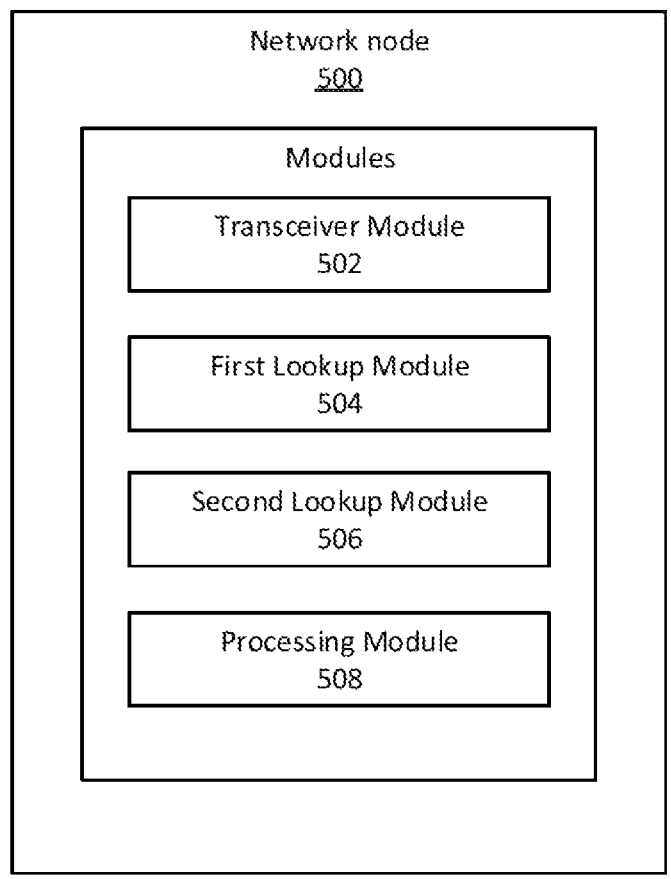
FIG. 7 is a block diagram of a network node for outbound packet processing.

In some embodiments, a node can comprise a series of modules configured to implement the various functionalities of network node 400 described herein. Referring to FIG. 7, in some embodiments, the network node 500 can comprise a transceiver module 502, a first lookup module 504, a second lookup module 506 and a processing module 508. Network node 500 can be operative to process outbound packet traffic. Transceiver module 502 is configured to receive and transmit packets, including receiving a packet including one or more TS parameters. First lookup module 504 is configured to perform a first lookup in a first table to identify a SA associated with a received packet in accordance with at least one of the TS parameters included in the packet. Second lookup module 506 is configured to perform a second lookup in a second table to determine a SPI value associated with the packet and the identified SA in accordance with at least one of the TS parameters. Processing module 508 is configured to process the packet by encrypting the packet using a security key from the identified SA and adding the determined SPI value to the encrypted packet.

Figure 8:
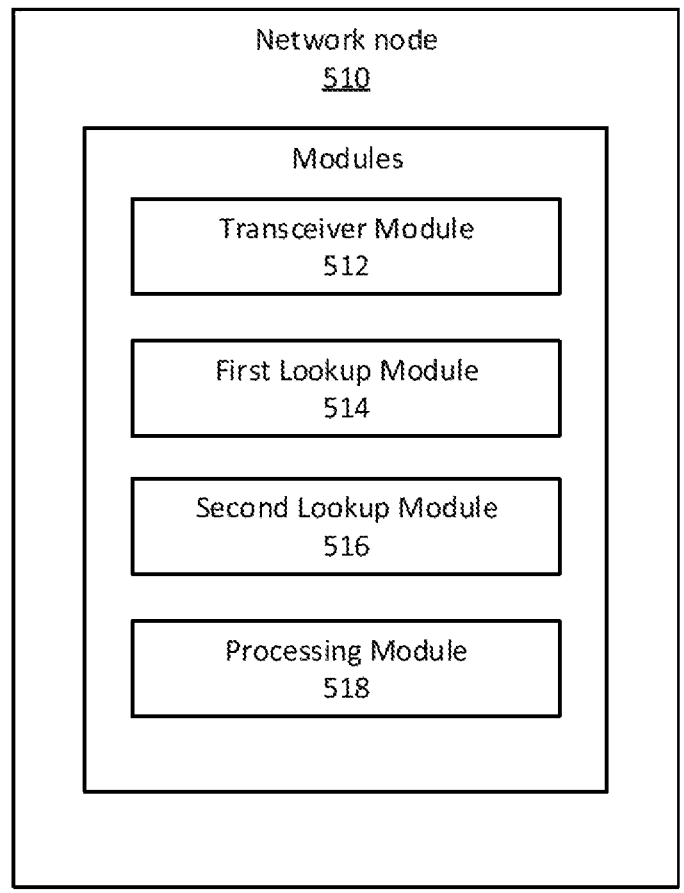
FIG. 8 is a block diagram of a network node for inbound packet processing.

Referring to FIG. 8, in some embodiments, the network node 510 can comprise a transceiver module 512, a first lookup module 514, a second lookup module 516 and a processing module 518. Network node 510 can be operative to process inbound packet traffic. Transceiver module 512 is configured to receive and transmit packets, including receiving an encrypted packet including a SPI value. First lookup module 512 is configured to perform a first lookup in a first table to identify a SA associated with the packet in accordance with the SPI value. Second lookup module 514 is configured to perform a second lookup in a second table to determine one or more traffic selector (TS) parameters in accordance with the SPI value. Processing module 518 is configured to decrypt the packet using a security key from the identified SA, verify the packet by comparing TS parameters in decrypted packet to the TS parameters determined by the second lookup, and to process the decrypted packet.

It will be appreciated that the various modules of FIGS. 7 and 8 can be implemented as combination of hardware and software, for instance, the processor 402, memory 404 and communication interface(s) 406 of network node 400 shown in FIG. 6. Some embodiments may also include additional modules to support additional and/or optional functionalities.

Some embodiments may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD- ROM), digital versatile disc read only memory (DVD-ROM) memory device (volatile or non-volatile), or similar storage mechanism. The machine-readable medium may contain various sets of instructions, code sequences, configuration information, or other data, which, when executed, cause processing circuitry (e.g. a processor) to perform steps in a method according to one or more embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description.

What is claimed is:

1. A method for outbound packet processing, the method comprising:
   receiving a packet, the packet including one or more traffic selector (TS) parameters;
   performing a first lookup in a first table to identify a Security Association (SA) associated with the packet in accordance with at least one of the TS parameters;
   responsive to identifying the SA, performing a second lookup in a second table to determine a Security Parameters Index (SPI) value associated with the packet and the identified SA in accordance with at least one of the TS parameters;
   processing the packet by encrypting the packet using a security key from the identified SA and adding the determined SPI value to the encrypted packet; and
   transmitting the processed packet.

2. The method of claim 1, wherein determining the SPI value includes selecting the SPI value from a plurality of SPI values associated with the identified SA.

3. The method of claim 1, wherein a security policy defines the at least one of the TS parameters from the received packet to be used for the first lookup.

4. The method of claim 1, wherein the first table is a security policy database.

5. The method of claim 1, wherein the second table is a SPI database.

6. The method of claim 5, wherein the SPI database is associated with the identified SA.

7. A network node comprising circuitry including a processor and a memory, the memory containing instructions executable by the processor whereby the network node is operative to:
   receive a packet, the packet including one or more traffic selector (TS) parameters;
   perform a first lookup in a first table to identify a Security Association (SA) associated with the packet in accordance with at least one of the TS parameters;
   responsive to identifying the SA, perform a second lookup in a second table to determine a Security Parameters Index (SPI) value associated with the packet and the identified SA in accordance with at least one of the TS parameters;
   process the packet by encrypting the packet using a security key from the identified SA and adding the determined SPI value to the encrypted packet; and
   transmit the processed packet.

8. The network node of claim 7, wherein determining the SPI value includes selecting the SPI value from a plurality of SPI values associated with the identified SA.

9. The network node of claim 7, wherein a security policy defines the at least one of the TS parameters from the received packet to be used for the first lookup.

10. The network node of claim 7, wherein the first table is a security policy database.

11. The network node of claim 7, wherein the second table is a SPI database.

12. The network node of claim 11, wherein the SPI database is associated with the identified SA.

13. A method for inbound packet processing, the method comprising:
    receiving an encrypted packet, the packet including a Security Parameters Index (SPI) value;
    performing a first lookup in a first table to identify a Security Association (SA) associated with the packet in accordance with the SPI value;
    responsive to identifying the SA, performing a second lookup in a second table to determine one or more traffic selector (TS) parameters in accordance with the SPI value;
    decrypting the packet using a security key from the identified SA;
    verifying the packet by comparing TS parameters in decrypted packet to the TS parameters determined by the second lookup; and
    processing the decrypted packet.

14. The method of claim 13, wherein the identified SA is associated with a plurality of SPI values.

15. The method of claim 13, wherein processing the decrypted packet includes forwarding the decrypted packet towards a destination.

16. The method of claim 13, wherein the first table is a security policy database.

17. The method of claim 13, wherein the second table is a TS parameter database.

18. A network node comprising circuitry including a processor and a memory, the memory containing instructions executable by the processor whereby the network node is operative to:
    receive an encrypted packet, the packet including a Security Parameters Index (SPI) value;
    perform a first lookup in a first table to identify a Security Association (SA) associated with the packet in accordance with the SPI value;
    responsive to identifying the SA, perform a second lookup in a second table to determine one or more traffic selector (TS) parameters associated in accordance with the SPI value;
    decrypt the packet using a security key from the identified SA;
    verify the packet by comparing TS parameters in decrypted packet to the TS parameters determined by the second lookup; and
    process the decrypted packet.

19. The network node of claim 18, wherein the identified SA is associated with a plurality of SPI values.

20. The network node of claim 18, wherein processing the decrypted packet includes forwarding the decrypted packet towards a destination.

21. The network node of claim 18, wherein the first table is a security policy database.

22. The network node of claim 18, wherein the second table is a TS parameter database.

\* \* \* \* \*